United States Patent
Yakimishyn et al.

(10) Patent No.: US 12,286,358 B2
(45) Date of Patent: Apr. 29, 2025

(54) PROCESS FOR PRODUCTION OF POTASSIUM SULFATE, AMMONIUM SULFATE, AND CALCIUM CARBONATE FROM SYNGENITE

(71) Applicant: Upcycle Minerals Inc., Saskatoon (CA)

(72) Inventors: Rick Yakimishyn, Saskatoon (CA); Jonathon Franklin Phinney, Martensville (CA)

(73) Assignee: UPCYCLE MINERALS INC., Saskatchewan (CA)

( * ) Notice: Subject to any disclaimer, the term of this patent is extended or adjusted under 35 U.S.C. 154(b) by 544 days.

(21) Appl. No.: 17/722,634

(22) Filed: Apr. 18, 2022

(65) Prior Publication Data
US 2022/0340437 A1   Oct. 27, 2022

Related U.S. Application Data

(60) Provisional application No. 63/180,207, filed on Apr. 27, 2021.

(51) Int. Cl.
  *C01D 5/12*   (2006.01)
  *C01B 17/96*  (2006.01)
  *C01C 1/24*   (2006.01)

(52) U.S. Cl.
  CPC ............ *C01D 5/12* (2013.01); *C01C 1/24* (2013.01); *C01B 17/96* (2013.01)

(58) Field of Classification Search
None
See application file for complete search history.

(56) References Cited

U.S. PATENT DOCUMENTS

| | | | | |
|---|---|---|---|---|
| 3,628,940 A | * | 12/1971 | Geissler | C05B 7/00 423/385 |
| 6,315,976 B1 | * | 11/2001 | Phinney | C01C 1/028 423/430 |
| 6,334,990 B1 | * | 1/2002 | Phinney | C01D 7/123 423/430 |

OTHER PUBLICATIONS

Alton Gabriel and Everett P. Partridge, "Production of Potassium Sulfate from Polyhalite and Sylvinite", Industrial & Engineering Chemistry 1935 27 (7), 801-806 (Year: 1935).*

* cited by examiner

*Primary Examiner* — Coris Fung
*Assistant Examiner* — Jialan Zhang
(74) *Attorney, Agent, or Firm* — Michael R. Williams; Kyle Satterthwaite; Ryan W. Dupuis

(57) ABSTRACT

Described herein is a process for the production of potassium sulfate and ammonium sulfate from syngenite. Specifically, the syngenite is produced from waste liquors and low value minerals and is used to produce valuable secondary products. Specifically, instead of performing the decomposition reaction in one step at high temperature, this process performs the reaction in 2 steps at temperatures lower than the decomposition temperature of ammonium bicarbonate: a first step to reach the equilibrium and produce saturated potassium sulfate brine, and a second step to complete the syngenite decomposition reaction.

23 Claims, No Drawings

PROCESS FOR PRODUCTION OF POTASSIUM SULFATE, AMMONIUM SULFATE, AND CALCIUM CARBONATE FROM SYNGENITE

PRIOR APPLICATION INFORMATION

The instant application claims the benefit of US Provisional Patent Application 63/180,207, filed Apr. 27, 2021, and entitled "Process for Production of Potassium Sulfate, Ammonium Sulfate, and Calcium Carbonate from Syngenite", the entire contents of which are incorporated herein by reference for all purposes.

BACKGROUND OF THE INVENTION

The formation of syngenite from brines containing NaCl, and KCl is a known process. For example, the US Department of Interior Bulletin 459 Potash Salts from Texas-New Mexico Polyhalite Deposits (1944) explains conditions required for formation of syngenite. Syngenite will form under 35 Degrees Celsius and is limited to the amount of $K^+$, $Ca^{++}$ and $SO_4^{--}$ in solution along with temperature. With NaCl present, the formation of stable syngenite is depressed somewhat. Higher temperatures favor pentasalt formation and must be avoided.

U.S. Pat. No. 2,033,159 teaches a process to calcine syngenite and decompose in hot water. The process results in a dilute $K_2SO_4$ brine and takes well over 4 hours of residence time.

U54554139 teaches a process for producing syngenite from sodium chloride-potassium chloride brines and decomposing with hot concentrated sulfuric acid or nitric acid.

U.S. Pat. No. 2,094,573 teaches a method of combining potassium chloride and ammonium sulfate in water to create $5K_2SO_4$—$(NH_4)_2SO_4$ double salt, also referred to herein as the "5:1 double salt".

DE102015003289A1 teaches a process of reacting potassium chloride with ammonium sulfate in water to produce potassium sulfate (double salt) and describes the problems with the resulting solution created from this reaction. The "conversion solution" has phosphorous containing fertilizer added and kept as a low value complex fertilizer.

U.S. Pat. No. 6,334,990 B1 teaches a method of decomposing syngenite with ammonium bicarbonate in water at elevated temperatures producing an ammonium sulfate-potassium sulfate brine. Solid potassium chloride is added to the brine to react with ammonium sulfate, precipitating additional potassium sulfate and ammonium chloride. The brine of potassium chloride and ammonium chloride is evaporated to recover potassium chloride and ammonium chloride. The sodium chloride brine (produced from syngenite reaction) is treated with ammonium bicarbonate to form sodium bicarbonate using the Solvay Process, calcining calcium carbonate (which was produced from syngenite reaction) to provide calcium oxide which is reacted with the produced ammonium chloride regenerating ammonia and disposing calcium chloride.

U.S. Pat. No. 6,334,990 assumes 100% conversion at each reaction step, but in reality, ammonia-bicarbonate reactions like the Solvay process, are equilibrium reactions which do not come close to 100% completion.

As will be appreciated by those of skill in the art and as discussed herein, the reaction of syngenite with ammonia-$CO_2$ is in fact an equilibrium reaction. Under optimum reaction conditions, with an excess of ammonium bicarbonate, the reaction will proceed to maximum 80% completion. Excessive ammonia-$CO_2$ does not advance the reaction much further due to the suppressing effect of ammonium sulfate and potassium sulfate reaction products. Furthermore, the conditions described in U.S. Pat. No. 6,334,990 are at a temperature well above the decomposition temperature of ammonium bicarbonate/ammonium carbonate which will cause it to be driven out of the reaction before it can react with syngenite.

Yet further, the reaction of ammonium sulfate and potassium chloride requires excess potassium chloride and produces ammonium chloride which cannot be effectively separated from the unreacted potassium chloride. The process will produce potassium sulfate, but requires the use of expensive reagents which cannot be effectively recovered. DE102015003289A1 states "Unfortunately, it has been shown that it is not possible to obtain a sufficiently pure ammonium chloride either by evaporation of the conversion solution or by combined evaporation and cooling crystallization. This is due to the solution equilibria of the KCl—$NH_4Cl$—$H_2O$ system. If the dissolved $NH_4Cl$ is to be selectively crystallized out, the remaining potassium chloride accumulates in the solution phase relative to the ammonium chloride and instead of pure $NH_4Cl$ crystallizate is a KCl—$NH_4$ crystal because the potassium level increases with the increase of the K—$NH_4$ reaction in the solution. Potassium is incorporated into both the $NH_4Cl$ crystals and, conversely, WWI in the KCl crystals."

Also, the 5:1 double salt will still be produced using this method.

SUMMARY OF THE INVENTION

According to a first aspect of the invention, there is provided a method for producing potassium sulfate and ammonium sulfate comprising:
(a) forming a syngenite cake and a liquor by reacting a source of sulfate ions with potassium chloride and calcium sulfate at a temperature of about 5 to about 35 C for approximately 1-4 hrs;
(b) separating the syngenite cake from the liquor;
(c) mixing the syngenite cake with a reaction brine comprising dilute potassium sulfate, ammonium sulfate and ammonium bicarbonate at a temperature of about 5 to about 70 C for 1-2 hours, thereby producing a syngenite-$CaCO_3$ cake and a potassium sulfate/ammonium sulfate solution;
(d) separating the syngenite-$CaCO_3$ cake from the potassium sulfate/ammonium sulfate solution;
(e) reacting the syngenite-$CaCO_3$ cake with an excess of ammonium bicarbonate in water at a temperature of about 5 to about 70 C for a period of time, thereby forming a $CaCO_3$ product and a reacted brine comprising potassium sulfate, ammonium sulfate and ammonium bicarbonate; and
(f) separating potassium sulfate from the potassium sulfate/ammonium sulfate solution produced in step (d).

In some embodiments of the invention, the potassium sulfate is separated from the potassium sulfate/ammonium sulfate solution by evaporating the potassium sulfate/ammonium sulfate solution at a temperature of about 90 to about 120 C, thereby producing $5K_2SO_4$:$(NH_4)_2SO_4$ double salt and a saturated ammonium sulfate/potassium sulfate solution.

In some embodiments of the invention, the saturated ammonium sulfate/potassium sulfate solution is cooled to a temperature of about 5 C to about 60 C or below, thereby precipitating additional double salt and producing a saturated ammonium sulfate solution.

In some embodiments of the invention, the double salt is separated from the ammonium sulfate solution.

In some embodiments of the invention, ammonium sulfate is leached from the 5:1 double salt with water at a temperature of about 0 to about 40 C, for example, about 20 to about 30 C or below so as to selectively dissolve the ammonium sulfate from the double salt, thereby producing an agricultural grade potassium sulfate fertilizer product. In some embodiments, the potassium sulfate fertilizer product has over 50% $K_2O$ purity.

As will be appreciated by one of skill in the art, the ammonium sulfate solution can be evaporated to produce the ammonium sulfate fertilizer product.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

As used herein, "about" and "approximately" refer to numbers that are within 10%, that is, plus or minus 10% of the recited value. For example, "about 50 C" or "approximately 50 C" refers to a temperature that is between 45-55 C.

As will be appreciated by one of skill in the art, as used herein, especially when describing reaction steps, "ammonium bicarbonate" can be considered to be functionally equivalent with "$NH_3$, $CO_2$ and $H_2O$". That is, one of skill in the art understands that these compounds can be combined to produce ammonium bicarbonate, as discussed herein.

Herein, reference is made to the following reactions, which can be summarized as follows:

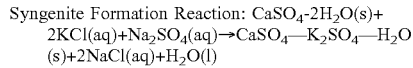
Syngenite Formation Reaction: $CaSO_4 \cdot 2H_2O(s)+ 2KCl(aq)+Na_2SO_4(aq) \rightarrow CaSO_4—K_2SO_4—H_2O(s)+2NaCl(aq)+H_2O(l)$

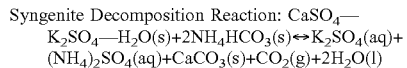
Syngenite Decomposition Reaction: $CaSO_4— K_2SO_4—H_2O(s)+2NH_4HCO_3(s) \leftrightarrow K_2SO_4(aq)+ (NH_4)_2SO_4(aq)+CaCO_3(s)+CO_2(g)+2H_2O(l)$

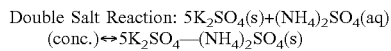
Double Salt Reaction: $5K_2SO_4(s)+(NH_4)_2SO_4(aq)$ (conc.)$\leftrightarrow 5K_2SO_4—(NH_4)_2SO_4(s)$ As discussed above and as will be known to those of skill in the art, the original syngenite processes were hot water decomposition producing a dilute potassium sulfate brine which required excessive water evaporation which made the process uneconomical. Other proposed methods were to decompose syngenite in extremely hot sulphuric acid solution to produce potassium bisulfate and ultimately potassium sulfate. This was not possible due to materials of construction limitations.

Furthermore, as discussed above, for example U.S. Pat. No. 6,334,990 was limited to the equilibrium of the syngenite-ammonia reaction which would result in low yields which would make the process uneconomic.

Yet further, the prior art methods could not overcome the formation of the 5:1 double salt and attempted to overcome its formation by the KCl-ammonium sulfate reaction. This creates a waste solution of ammonium chloride and potassium chloride which cannot be recovered as a commercial product without excessive losses of each.

Accordingly, described herein is a process for the production of potassium sulfate and ammonium sulfate from syngenite. As discussed herein, this new process is improved over the prior art for at least for the following reasons:

(1) Potassium sulfate is produced from waste liquors and low value minerals, meaning that there is no requirement to purchase expensive potassium chloride. Instead of using potash, a valuable commodity, this process uses unrecoverable KCl in potash tailings brines.

(2) Valuable secondary products are produced. Ammonium sulfate is a valuable fertilizer and precipitated calcium carbonate is an excellent filler and pigment extender.

(3) While prior art methods cannot complete the syngenite decomposition reaction and attempt to overcome this with a complex KCl reaction and additional calcination and evaporation steps for ammonia recovery, this process overcomes the equilibrium and will convert 99% of syngenite into products.

Specifically, as discussed in greater detail below, instead of performing the decomposition reaction in one step at high temperature, this process performs the reaction in 2 steps at temperatures lower than the decomposition temperature of ammonium bicarbonate: a first step to reach the equilibrium and produce saturated potassium sulfate brine, and a second step to complete the syngenite decomposition reaction.

(4) The calcium carbonate produced by the process produces 98-99 L* brightness which is significant for use as or with fillers/pigments. The high brightness reflects the purity of the end product and can be compared to the 80-95 brightness produced by for example U.S. Pat. No. 6,334,990, wherein the low brightness is due to the reaction only proceeding to ~70% completion. This reference tries to overcome this by calcining the impure $CaCO_3$ to CaO and then utilize the CaO to regenerate $NH_3$ from the $NH_4Cl$, which is very costly and difficult to do.

In contrast, instead of reacting the ammonium sulfate with KCl and trying to evaporate, purify, recycle KCl and regenerate $NH_3$ from $NH_4Cl$, and dispose of $CaCl_2$), this process uses a new evaporation process to separate potassium sulfate and ammonium sulfate into two valuable products.

Specifically, as discussed below, the method or process described herein comprises an evaporation process which overcomes the complex and unworkable KCl-ammonium sulfate reaction to produce potassium sulfate. The 47% $K_2O$ double salt is overcome by the leaching step to produce 50+% $K_2O$ potassium sulfate (agricultural grade).

According to an aspect of the invention, there is provided a method for producing potassium sulfate and ammonium sulfate comprising:

(a) forming a syngenite cake and a liquor by reacting a source of potassium chloride and sulfate ions with calcium sulfate at a temperature of about 5 C to about 35 C for approximately 1-4 hrs;

(b) separating the syngenite cake from the liquor;

(c) mixing the syngenite cake with a reaction brine comprising potassium sulfate, ammonium sulfate and ammonium bicarbonate at a temperature of about 5 C to about 70 C for 1-2 hours, thereby producing a syngenite-$CaCO_3$ cake and a potassium sulfate/ammonium sulfate solution;

(d) separating the syngenite-$CaCO_3$ cake and the potassium sulfate/ammonium sulfate solution;

(e) reacting the syngenite-CaCO$_3$ cake with an excess of ammonium bicarbonate in water at a temperature of about 5 C to about 70 C or below, thereby forming a CaCO$_3$ cake and a reacted brine comprising potassium sulfate, ammonium sulfate and ammonium bicarbonate; and (f) separating potassium sulfate from the potassium sulfate/ammonium sulfate solution.

In some embodiments of the invention, the potassium sulfate is separated from the potassium sulfate/ammonium sulfate solution by evaporating the potassium sulfate/ammonium sulfate solution at a temperature of about 90 C to about 120 C, thereby producing 5K$_2$SO$_4$:(NH$_4$)$_2$SO$_4$ double salt.

As discussed herein, the decomposition of syngenite with ammonia and CO$_2$ or ammonium bicarbonate (or carbonate) is an equilibrium reaction. Typical ammonia-CO$_2$ Solvay style reactions, used herein to refer generally to any chemical reaction where a compound is reacted with NH$_3$ and CO$_2$, will proceed 60-80% to completion as the formation of the reaction products depress the forward reaction, while, in this reaction, lower temperatures also slow the reaction due to the endothermic nature of the this reaction. Furthermore, ammonium bicarbonate will decompose rapidly at temperatures of greater than 60 C to ammonium carbonate and then into ammonia and CO$_2$ which will de-gas and prevent reaction.

Excess ammonium bicarbonate does not complete the reaction with concentrated potassium sulfate and ammonium sulfate present. At 60 C and excess ammonium bicarbonate, the reaction will proceed up to a maximum of 80% completion. This will result in low recovery of potassium sulfate, and impure calcium carbonate.

The reaction of potassium chloride with ammonium sulfate is avoided in this process due to the difficulties in separating ammonium chloride and potassium chloride mentioned in DE102015003289A1. Instead, the resulting K$_2$SO$_4$—(NH$_4$)$_2$SO$_4$ brine is used in an evaporation process producing potassium sulfate, K$_2$SO$_4$:(NH$_4$)$_2$SO$_4$ double salt 5:1 ratio, and ammonium sulfate product. In some embodiments of the invention, the double salt is then selectively leached with cool brine and water to dissolve ammonium sulfate increasing the purity to over 50% K$_2$O.

The formation of the 5:1 double salt depends on the concentration of ammonium sulfate. At high concentrations of ammonium sulfate the 5:1 double salt is favored. Potassium sulfate which contacts a highly concentrated ammonium sulfate brine for an extended period of time will mostly convert into this double salt. However, the double salt will yield its ammonium sulfate into solution when in contact with brine undersaturated with ammonium sulfate. For example, concentrated ammonium sulfate brine at 50 C holds only 4.3% K$_2$SO$_4$ in solution. This is exploited in the evaporation process, as discussed herein. As will be appreciated by one of skill in the art, the brine may be cooled to different temperatures, which will result in differences in precipitation.

Potassium sulfate is a fully soluble, premium fertilizer providing both potassium and sulphur macronutrients without the detrimental chloride found in potash. As will be known by those of skill in the art, "potash" can refer to either potassium carbonate or KCl. Yet further, KCl is often referred to as "muriate of potash" or MOP while K$_2$SO$_4$ is often referred to as "sulfate of potash" or SOP. Potassium sulfate is also difficult to produce and is made from high grade (and high cost) white potash. Agricultural grade potassium sulfate is minimum +50% K$_2$O or ~92% purity, which also reflects the difficulty of achieving purity via any process. Some naturally occurring deposits exist that require very high rates of evaporation and complicated processing to produce potassium sulfate.

The traditional method to produce potassium sulfate is the Mannheim process which is high temperature roasting of potassium chloride and sulphuric acid. Hydrochloric acid vapour is formed in the process. This method is costly and polluting.

More recently, Potassium sulfate is produced via the Glaserite process, which involves reacting potassium chloride and sodium sulfate. It requires expensive white potash and anhydrous sodium sulfate, with a complicated evaporation process to recover unreacted sodium sulfate/potassium chloride/sodium chloride In some embodiments of the invention, the sulfate ion source comprises sodium sulfate, and/or magnesium sulfate.

Sodium sulfate is harvested from alkali lakes as Glauber's Salt (Na$_2$SO$_4$-10H$_2$O) and processed into the anhydrous form. The process of the invention can use raw Glauber's salt as it only needs to be dissolved into brine. It is important to note that sodium sulfate is a low value product and is not a fertilizer.

In some embodiments of the invention, the potassium ion source comprises potash tailings brine.

Waste liquors from the potash industry (typically 7-11% KCl and 20-22% NaCl, 0-5% MgCl$_2$, 0.2% CaSO$_4$) are produced at Sylvinite mining operations and are discarded via deep-well injection. This is due to a typical KCl recovery of 80-85% depending on the operation. A large potash mine will create a substantial amount of both solid and liquid tailings. Liquid tailings are typically injected into deep formations for disposal.

As discussed herein, potash tailings brine has no value. The KCl could be extracted by evaporation/crystallization but it is not economical to do so at conventional mines. Furthermore, it cannot be used as a fertilizer due to the presence of NaCl. A conventional potash mine recovers ~80-85% of the KCl from its sylvinite ore, which is approximately 30% KCl and 70% NaCl, the rest is lost to either the brine used for flotation, or fines lost to the solid tailings.

In some embodiments of the invention, the sulfate ion source comprises up to 20% MgSO$_4$.

The process of the invention requires a supply of SO$_4$__ radicals and as such can handle sodium sulfate contaminated with for example, magnesium sulfate or ammonium sulfate, as discussed above. Sodium sulfate is preferred as the bulk of the sulfate source because other double sulfate salts will start being formed if the concentration of those other salts becomes highly concentrated. For example, polyhalite will form with very high Mg concentration.

In some embodiments of the invention, the calcium sulfate is gypsum.

While gypsum can be used as a soil conditioner, it has little value as a fertilizer.

In some embodiments of the invention, the gypsum is ground to less than −10 MESH (US Standard). As will be appreciated by one of skill in the art, this means that the gypsum has been ground such that the average diameter thereof is approximately 2 mm or 0.2 cm.

−10 MESH (US Standard) and smaller will react quickly enough to form syngenite. Finer grinding reduces the size of calcium carbonate crystals formed and can be matched to end user's specifications.

For example, in some embodiments of the invention, calcium sulfate in the form of natural gypsum with 92% purity is ground to −50 MESH (US Standard). Gypsum being a relatively soft mineral pulverizes very easily.

In some embodiments of the invention, the gypsum is mixed with $H_2SO_4$ prior to reacting with the calcium sulfate.

Specifically, when a small amount of $H_2SO_4$ is added to the ground gypsum with water, a slurry is formed and impurities will dissolve while converting any limestone present into gypsum and soluble sulfate minerals. The resulting gypsum slurry would be 97-99% purity. The soluble sulfate minerals will be consumed in the syngenite forming reaction.

As discussed herein, the gypsum is added to the potash tailing brine in syngenite reaction tanks along with the appropriate amount a soluble sulfate mineral, for example, sodium sulfate, which can be either anhydrous, or Glaubers salt, and can contain $MgSO_4$ impurities. Other suitable soluble sulfate minerals will be readily apparent to one of skill in the art.

In some embodiments of the invention, for example the gypsum and sodium sulfate are added stoichiometrically to the KCl in the tailings brine, bearing in mind that it may be necessary to take into account the 5-6 g KCl/100 g $H_2O$ that won't react. For example, if there was 15 g/100 g KCl in the tailings brine, sufficient gypsum and sodium sulfate would be added to the tailings brine to react with 9-10 g KCl/100 g water.

If necessary, a small amount of water may be added, to prevent the precipitation of sodium chloride.

The reaction is carried out at a temperature between about 5 C to about 35 C, for example, about 10 C to about 35 C, about 5 C to about 25 C, to about 10 C to about 25 C, or below 35 C, preferably below 25 C for about 1-4 hours, for example, for 2 hours. The end result is an 88-93% purity syngenite formed in the reaction.

The syngenite is filtered from the mother liquor and displacement washed with water to remove remaining mother liquor from the filter cake. The spent liquor is sent to a deep injection well for disposal. The wet syngenite cake contains 88-93% syngenite, 6-8% unreacted calcium sulfate, and up to 3% impurities.

The cake is transferred to a first syngenite decomposition reaction tank where it is re-slurried with liquor from the second reaction step (which is a dilute brine consisting of potassium sulfate, ammonium sulfate, and unreacted ammonium bicarbonate, typically 25% of the overall reaction products, described in greater detail below). This second reaction liquor will contain approximately 2-7 g potassium sulfate/100 g water and approximately 2-7 g ammonium sulfate/100 g water along with 4.7-14.2 g/100 g water ammonium bicarbonate.

As will be appreciated by one of skill in the art, the concentration of the brine in this step is kept low so as to help the reaction go to 99% completion.

For example, enough water is provided so that the first reaction step will produce saturated potassium sulfate brine, as discussed above.

In some embodiments of the invention, the syngenite to brine ratio will be 295-330 g of water per 100 g of syngenite. This will result in saturated potassium sulfate brine 16-18 g/100 g water @ 60-70 C.

Additional ammonium bicarbonate is added to the liquor to bring the ammonium bicarbonate concentration to the stoichiometrically required amount to decompose 80-120%, for example, 80-100% or 90-100% (90% target) of the syngenite/gypsum cake.

As will be appreciated by one of skill in the art, the amount of ammonium bicarbonate added is determined by the weight of the syngenite cake.

For example, the cake may be weighed and the moisture within the reaction may be measured for determining the amount of ammonium bicarbonate to be added.

The reaction is carried out at a temperature of about 5 to about 70 C, about 10 to about 70 C, 70 C or below, or for example, about 20 to about 70 C, preferably about 55 C to about 65 C for 0.5-4 hours, for example, for about 1-2 hours or for about 2 hours. Specifically, while 2 hours residence time is preferred, the reaction can take between 0.5 and 4 hours.

The small amount of unreacted gypsum will instantly react, followed by the syngenite which will react with ammonium bicarbonate up to a maximum of 80% (target 75%) of the syngenite until the equilibrium is reached. The mother liquor created in this reaction is now saturated or nearly saturated with potassium sulfate, and contains approximately 15-18 g/100 g water potassium sulfate and approximately 14-18 g/100 g water ammonium sulfate. Approximately 0-10% of the ammonium bicarbonate is unreacted and remains in solution. The mother liquor is sent to the evaporation step which is discussed below.

As will be appreciated by one of skill in the art, the cooler the reaction, the less potassium sulfate the brine will hold and it will take more energy to evaporate the additional water, as discussed below. However, with high temperature, the ammonia-$CO_2$ will degas from the solution before the reaction can take place. Furthermore, too much ammonia-$CO_2$ will lower the concentration of potassium sulfate in brine and require energy to remove.

The syngenite-$CaCO_3$ cake, which is now 70-80% converted into calcium carbonate, is filtered, displacement washed with water, and transferred to the second syngenite decomposition reaction tank. In this tank, the cake is re-slurried with water and 200-400% of the required ammonium bicarbonate (to react with the remaining 20-25% of unreacted syngenite) is added. This reaction is run at a temperature of 70 C or below, for example, at about 5 C to about 70 C, about 10 to about 70 C, about 20 to about 70 C or about 40 C to about 60 C or at about 40 C, to avoid decomposition of ammonium bicarbonate. A vigorous reaction occurs, but the reaction is allowed to proceed for 1-4 hours, for example, for about 1-2 hours or about 2 hours, to match the residence time of the 1st reaction.

This second step converts the remaining syngenite into potassium sulfate, ammonium sulfate, and $CaCO_3$. The mother liquor from this step is approximately 2-7 g potassium sulfate/100 g water and approximately 2-7 g ammonium sulfate/100 g water along with approximately 4.7-14.2 g/100 g water ammonium bicarbonate.

After this reaction step, approximately 98-99% of the syngenite has been converted into potassium sulfate, ammonium sulfate, and calcium carbonate.

The $CaCO_3$ cake is filtered and washed, while in some embodiments, the mother liquor is sent to the 1st reaction vessel. As will be appreciated by one of skill in the art, the unreacted ammonium bicarbonate will react with the fresh syngenite in the 1st reaction.

The $CaCO_3$ cake can be re-slurried with water and filtered again to fully remove residual brine and improve purity if necessary. All wash liquors may be re-used in the second reaction vessel to prevent losses. The $CaCO_3$ product is dried and placed into product storage. The $CaCO_3$ Product is 95+% purity and has a measured L* brightness of 98-99, which is acceptable for use as precipitated calcium carbonate. The initial grinding of gypsum helps determine the calcium carbonate particle size which can be matched to industry specifications, as discussed above.

As discussed above, the first reaction mother liquor contains some unreacted ammonium bicarbonate/carbonate and is saturated with potassium sulfate and undersaturated with ammonium sulfate while at the reaction temperature, for example, at about 60 C. The first reaction liquor is sent to an evaporator pre-heater vessel where the temperature is increased to over about 90 C, for example, about 90 C to about 120 C or about 90 C to about 115 C. At this temperature, the unreacted ammonium bicarbonate decomposes into ammonium carbonate, and finally ammonia and $CO_2$ gases. The gases may be collected and recycled to produce ammonium bicarbonate, as discussed above.

In some embodiments of the invention, a very small amount of $H_2SO_4$ may be added at this step to fully convert any small amounts of dissolved ammonia into ammonium sulfate. The degassed liquor is now prepared for evaporation.

The liquor is now sent to an evaporation process where water is removed at elevated temperature between about 90 and about 115 C. As water is removed, potassium sulfate is first precipitated due to its much lower solubility than ammonium sulfate, which stays in solution due to its high solubility. Additional water is removed until is the liquor or brine is saturated with ammonium sulfate. As ammonium sulfate becomes more concentrated in solution, potassium sulfate precipitating from the solution will tend to form the $5K_2SO_4:(NH_4)_2SO_4$ double salt.

The brine is then sent to a cooling step, where the temperature is rapidly decreased from over about 120 C, for example, above about 100 C, for example about 100 C to about 120 C to about 5 C to about 60 C or about 10 C to about 60 C, for example about 40 C-to about 60 C or about 50 C to-about 60 C. This causes more potassium sulfate to precipitate from solution as the double salt. It was discovered during experimentation that both potassium sulfate and ammonium sulfate depress each other's overall solubility in water (compared to saturated solutions of each individually).

As will be appreciated by one of skill in the art, the evaporation process should not proceed much past saturation of ammonium sulfate or the ammonium sulfate will be crystallized from solution as well.

As will be apparent to one of skill in the art, the precipitated double salt can be processed as described herein or in any of a variety of means known in the art. For example, the double salt can be debrined and the remaining ammonium sulfate brine can be subjected to a spray dryer/granulator to form agricultural sized ammonium sulfate pellets, some ammonium sulfate from the 5:1 double salt can be removed via reslurrying in brine and small amount of water at low temperature to produce +50% $K_2O$ grade potassium sulfate fertilizer. Yet further, the double salt could be debrined, the crystals washed and dried and compacted into agricultural sized potassium sulfate pellets.

Specifically, as discussed above, following cooling, the mixture produced thereby comprises the double salt and a saturated ammonium sulfate solution. The double salt in this mixture may be separated from the saturated ammonium sulfate brine and reslurried, for example, by adding water such the reslurried mixture is 30-65% solids. The reslurry reaction may be carried out at a temperature between about 0 C to about 40 C, for example, about 20 C to about 30 C. Specifically, the reslurrying will selectively dissolve ammonium sulfate in the double salt, thereby producing a solid portion that is over 90%, for example, about 93.5% potassium sulfate. The solid potassium sulfate can then be separated from the reslurry brine and dried. As will be appreciated by one of skill in the art, this step leaches ammonium sulfate from the double salt, increasing the purity of the 47% $K_2O$ to +50% $K_2O$ so it can be sold as agricultural fertilizer.

Furthermore, the reslurry brine can be mixed with the saturated ammonium sulfate solution and evaporated to produce ammonium sulfate.

Accordingly, in some embodiments of the invention, prior to step (f), the potassium sulfate/ammonium sulfate solution from step (c) is heated to a temperature above about 90 C, for example, about 90 C to about 120 C or about 90 C to about 115 C, to decompose any unreacted ammonium bicarbonate into ammonia and $CO_2$ gases.

Accordingly, in some embodiments of the invention, following step (f), unevaporated potassium sulfate/ammonium sulfate solution is rapidly cooled to below 60 C to precipitate potassium sulfate as the $5K_2SO_4:(NH_4)_2SO_4$ double salt.

As discussed above, in some embodiments of the invention, the reacted brine of step (e) is used as the reaction brine of step (c).

As will be appreciated by one of skill in the art, additional syngenite decomposition steps may be added to the process to improve purity of the end products and/or efficiency and/or yield.

For example, adding an additional reaction stage before the first syngenite decomposition reaction could potentially allow for a more precise amount of ammonium bicarbonate to be used.

Furthermore, adding an additional reaction stage after the 2nd syngneite decomposition reaction could potentially decompose part of the last 1% of syngenite remaining in the cake.

In some embodiments, $NH_3$ and $CO_2$ vapors are collected and/or recovered from the various tanks and equipment and are used for ammonium bicarbonate synthesis. For example, a cold water scrubber can be used to recover $NH_3$ gases lost in the process. Alternatively, ammonia and $CO_2$ can be added directly to the reaction tanks. Specifically, in some embodiments, ammonia, carbon dioxide and water are reacted in a reaction vessel to produce ammonium bicarbonate. Ammonium bicarbonate is sent to the first and second stage syngenite reaction tanks as described herein.

In summary, as discussed herein, the syngenite reaction will only complete if in contact with 200-400% excess ammonium bicarbonate with low concentrations of reaction products present. The 2 stage process of the invention allows both concentrated potassium sulfate-ammonium sulfate brine and 99% reaction completion.

Specifically, 70-80% of the syngenite reacts with stoichiometric ammonium bicarbonate in 2nd reaction liquor. This produces a saturated potassium sulfate brine with little unreacted ammonium bicarbonate and a 70-80% reacted $CaCO_3$-Syngenite cake. This cake is reacted with 2-4× the required ammonium bicarbonate in water to react with the remaining 20-30% of syngenite. Furthermore, in those embodiments of the invention (re)using the 2nd reaction liquor in first reaction prevents losses of ammonium bicarbonate and potassium/ammonium sulfate, as discussed herein.

The prior art method, disclosed in U.S. Pat. No. 6,334,990, failed to understand that this is an equilibrium reaction and thought that raising the temperature to 90 C would complete the reaction but this actually boils off the ammonia-$CO_2$ further preventing reaction with syngenite.

Furthermore, if the prior art method simply added more ammonium bicarbonate and lowered the temperature, the reaction still would not proceed to completion due to the presence of concentrated potassium and ammonium sulfate driving the reverse reaction. Also, the excess ammonium bicarbonate would preferentially dissolve into solution, thereby lowering the solubility of potassium sulfate significantly. The final solution would need significant heat added to remove the excessive ammonia-$CO_2$.

As discussed herein, the invention also provides for the production of the $5K_2SO_4$:$(NH_4)_2SO_4$ double salt by evaporating water within the potassium sulfate/ammonium sulfate solution produced in step (c) and separated from the syngenite-$CaCO_3$ cake in step (d) until ammonium sulfate is saturated as the evaporation temperature reaches and exceeds about 90 C, for example, about 90 C to about 115 C or about 100 C. Subsequent cooling, for example, flash cooling to about 0 C to about 60 C, for example about 10 C to about 60 C or about 20 C to about 60 C or about 50 C, crystallizes most of the remaining potassium sulfate.

It is believed that those of skill in the art assumed that reacting the brine with (excess) potassium chloride would convert the ammonium sulfate into additional potassium sulfate and ammonium chloride. It is now known that separating ammonium chloride from the resulting solution is not feasible.

In summation, this process increases the decomposition of syngenite reaction from ~70-80% to 99% completion.

The Evaporation/leaching process produces 50+% $K_2O$ (agricultural grade) with over 90% yield.

The complicated and unworkable reaction of ammonium sulfate-potassium chloride is unnecessary.

The $CaCO_3$ produced is high enough brightness and purity to be used as precipitated calcium carbonate Furthermore, the process is at minimum "environmentally friendly", as carbon dioxide is captured in this process and potassium sulfate is extracted from potash mine waste liquors which are normally disposed.

Furthermore, low value minerals sodium sulfate and gypsum are utilized to make high value products.

The invention will now be further described and/or explained by way of example; however, the invention is not necessarily limited to or by the examples.

Sample Calculation of Evaporation Process

Typical brine produced in this process is 15.6 g potassium sulfate/100 g water and 15.2 g ammonium sulfate/100 g water. For a 1000 kg potassium sulfate example: 1000 kg potassium sulfate, 975 kg ammonium sulfate, and 6416 kg water. This brine is evaporated at 98-105 deg C. until 5256 kg of water is removed. The remaining solution @ 100-103 deg C. has a concentration of 18 g potassium sulfate/100 g water and 85 g ammonium sulfate/100 g water containing 208.8 kg potassium sulfate, 855 kg ammonium sulfate and 1160 kg water. 791.2 kg of potassium sulfate is precipitated from the solution along with up to 120.0 kg of ammonium sulfate in the form of the 5:1 double salt. This brine is now cooled to 50 deg C. in a separate vessel, crystallizing additional potassium sulfate double salt. The cooled brine now contains 8 g potassium sulfate/100 g water and 72 g ammonium sulfate/100 g water, containing 92.8 kg potassium sulfate, 835.2 kg ammonium sulfate, and 1160 kg water. This cooling crystallization step precipitated 116 kg of potassium sulfate and 17.6 kg ammonium sulfate combined as double salt, and up to 2-10 kg of additional ammonium sulfate. This evaporation step extracts about 91% of the potassium sulfate contained in the brine and requires evaporation of 5.88 Units of water per unit of potassium sulfate.

The cooled brine is sent for further evaporation where the remaining water is removed, producing a high value ammonium sulfate compound fertilizer.

The potassium ammonium sulfate double salt could be considered a valuable fertilizer as is, but is only 46-47% $K_2O$ compared to typical agricultural grade of 50% $K_2O$ and is further processed.

The potassium sulfate-ammonium sulfate double salt produced above is debrined and displacement washed with water via centrifuge, then reslurried with brine. This reslurry brine is saturated with potassium sulfate and ammonium sulfate at 20 degrees C., which can hold 6 g potassium sulfate/100 g water and 65 g ammonium sulfate/100 g water. Water is added to this slurry to make it undersaturated with both potassium and ammonium sulfate. The reslurry is carried out at 60% solids for 30 minutes. Ammonium sulfate and potassium sulfate will leach from the double salt until the solution becomes saturated as above. As per the sample calculation, 1047 kg of double salt is produced in the evaporation step which contains 86.6% potassium sulfate and 13.4% ammonium sulfate (907.2 kg potassium sulfate and 139.8 kg ammonium sulfate). 94 kg of water is added to the slurry which dissolves 5.6 kg of potassium sulfate and 60.9 kg of ammonium sulfate. The slurry is debrined via centrifuge and displacement washed with water, leaving 980 kg of potassium sulfate product with 92% purity which corresponds to 50% $K_2O$ (agricultural grade potassium sulfate). The potassium sulfate crystals are then dried and compacted into granular fertilizer with an industry standard compactor.

The brine used for the reslurry is recycled for use with fresh double salt, with the appropriate amount bled from the system and combined with the spent brine from evaporation and sent to the ammonium sulfate evaporation system to remove the remaining water.

To complete the sample calculation, 2248 kg of ammonium sulfate brine containing 896 kg of ammonium sulfate, 98 kg of potassium sulfate and 1254 kg of water is evaporated to remove the remaining water. A typical ammonium sulfate spray dryer/granulator performs the evaporation and forms agricultural sized pellets. 994 kg of compound fertilizer containing 90% ammonium sulfate and 10% potassium sulfate is produced. This is considered a valuable ammonium sulfate product since it also contains potassium with no chloride.

Overall, recovery of potassium sulfate for the $K_{50}$ Product is 90.2%, requiring 5.38 units of water evaporation per unit of $K_{50}$ Product. The ammonium sulfate product requires only 1.26 units of water evaporation per unit of product.

Alternatively, additional chilled water can be added to the reslurry step which will dissolve additional ammonium sulfate at the expense of some potassium sulfate to further increase the purity of the potassium sulfate product. 99% potassium sulfate can be achieved with the use of additional water with approximately 5-10% of potassium sulfate lost to the ammonium sulfate product.

LABORATORY EXAMPLES

Example 1—Syngenite can be Formed from Potash Brine, Gypsum, and Sodium Sulfate 25 g of natural gypsum is slurried with 25 g of distilled water and 1 gram of 60% w/w sulfuric acid for 30 minutes.

Bubbling indicates limestone/dolomite impurities reacting. To this slurry, 600 grams of potash brine @22 C (~9% KCl, 21% NaCl) is added along with 21 grams of sodium sulfate. The reaction is allowed to carry out for 2 hours at 25 C. The slurry is filtered, displacement washed with 60 g of distilled water and dried @ 120 C overnight. 42.5 g of cake is collected. Filter cake was analyzed by ICP-OES showing 51.6% potassium sulfate, 47.9% calcium sulfate, 0.4% residual sodium chloride, representing a cake that is 92% syngenite.

Example 2—Syngenite can Decomposed 98-99% Complete Using this Process, and Max 80% with a Single Step 41.3 g of 90% syngenite cake was slurried with 122.1 g of distilled water with 5.5 g potassium sulfate and 4.7 g ammonium sulfate (representing 2nd reaction liquor) @ 55 C. 22 g of ammonium bicarbonate is added and allowed to react for 2 hours while maintaining the temperature between 55 and 60 C. The solids were filtered via vacuum filter funnel, displacement washed with water and dried. The 1st reaction cake weighed 17.2 g and the reaction liquor was analyzed by ICP-OES showing 12.0% potassium sulfate and 12.1% ammonium sulfate. The 1st reaction proceeded approximately 79% complete. (This first step represents the limitation of the prior art)

In a separate beaker, the 1st reaction cake weighing 17.2 g was re-slurried with 122.1 g of distilled water @ 55 C and 17.2 g of ammonium bicarbonate added. The reaction initially bubbles rapidly, indicating reaction with syngenite, and held for 2 hours @ 55-60 C. The solids were filtered via vacuum filter funnel, displacement washed with distilled water, and dried. The 2nd reaction liquor was analyzed via ICP-OES showing 2.14% potassium sulfate and 1.70% ammonium sulfate. The 2nd reaction cake weighed 13.9 g and was analyzed by ICP-OES showing 95.4% $CaCO_3$, 1.9% potassium sulfate, 2.6% calcium sulfate. 98.5% of potassium sulfate is recovered from the syngenite cake. The $CaCO_3$ product has a measured L* brightness of 98.93 using a spectrophotometer indicating its suitability as precipitated calcium carbonate.

Example 3—the Evaporation Process Recovers Over 90% Potassium Sulfate and Creates the Double Salt Brine was prepared consisting of 125 g of potassium sulfate, 125 g of ammonium sulfate and 700 g of distilled water. This brine was heated to boiling and stirred with magnetic stirrer as salt precipitated while water was removed. A total of 571 g of water was removed and the brine allowed to cool to 50 deg C. The precipitated salts were filtered with a vacuum filter and very carefully displacement washed with a small amount of chilled distilled water and acetone to prevent dissolving the cake. The salt cake was dried at 120 C overnight and weighed 134.2 g. The cake was analyzed by ICP-OES and showed 85.09% potassium sulfate and 14.91% ammonium sulfate or 46.0% $K_2O$. This represents a recovery of 91.4% potassium sulfate Also, samples were taken @ 100 C, 50 C and 20 C and analyzed by ICP-OES to confirm the solubility of the salts.

Example 4—92+% Potassium Sulfate (+50 $K_2O$) can be Produced from Leaching the Double Salt 50 g of double salt from example #3 was slurried with 15 g of brine saturated with both potassium sulfate and ammonium sulfate at room temperature, and 15 g of distilled water. The slurry was stirred with a magnetic stirrer for 30 minutes. The slurry was filtered with a vacuum filter and displacement washed with distilled water and acetone to prevent dissolving the cake. The cake was dried at 120 C and weighed 44.6 g. Analysis by ICP-OES showed 93.10% potassium sulfate and 6.90% ammonium sulfate or 50.3% $K_2O$ fertilizer grade.

While the preferred embodiments of the invention have been described above, it will be recognized and understood that various modifications may be made therein, and the appended claims are intended to cover all such modifications which may fall within the spirit and scope of the invention.

The invention claimed is:

1. A method for producing potassium sulfate and ammonium sulfate comprising:
    (a) forming a syngenite cake and a liquor by reacting a source of sulfate ions and potassium chloride with calcium sulfate at a temperature of about 5° C. to about 35° C. for approximately 1-4 hrs;
    (b) separating the syngenite cake from the liquor;
    (c) mixing the syngenite cake with a reaction brine comprising dilute potassium sulfate, ammonium sulfate and ammonium bicarbonate at a temperature of about 5° C. to about 70° C. for 1-4 hours, thereby producing a syngenite-$CaCO_3$ cake and a solution comprising potassium sulfate and ammonium sulfate;
    (d) separating the syngenite-$CaCO_3$ cake from the solution;
    (e) reslurrying the syngenite-$CaCO_3$ cake in water and reacting the syngenite-$CaCO_3$ cake with 2-4 times a required amount of ammonium bicarbonate to react the syngenite from the syngenite $CaCO_3$ cake at a temperature of about 5° C. to about 70° C. for a period of time, thereby forming a $CaCO_3$ cake and a reacted brine comprising potassium sulfate, ammonium sulfate and ammonium bicarbonate; and
    (f) separating potassium sulfate from the solution produced in step (d).

2. The method according to claim 1 wherein the potassium sulfate is separated from the solution by evaporating the solution at a temperature of about 90° C. to about 120° C., thereby producing $5K_2SO_4:(NH_4)_2SO_4$ double salt and a saturated solution comprising ammonium sulfate and potassium sulfate.

3. The method according to claim 2 further comprising (g) cooling the saturated solution to a temperature of about 0° C. to about 60° C., thereby producing an additional 5:1 double salt and a saturated ammonium sulfate solution.

4. The method according to claim 3 wherein following step (g):
    (h) separating the additional 5:1 double salt from the saturated ammonium sulfate solution;
    i) reslurrying the additional 5:1 double salt in water at a temperature between about 0° C. to about 40° C., thereby leaching ammonium sulfate out of the additional 5:1 double salt and producing a potassium sulfate solid and an ammonium sulfate brine;
    (j) separating the potassium sulfate solid from the ammonium sulfate solution.

5. The method according to claim 4, further comprising:
    (k) evaporating the saturated ammonium sulfate solution to produce solid ammonium sulfate.

6. The method according to claim 5 comprising, prior to step (k), adding the ammonium sulfate brine to the saturated ammonium sulfate solution.

7. The method according to claim 1 wherein the source of sulfate ions and potassium chloride comprises sodium sulfate or magnesium sulfate, or another soluble sulfate mineral.

8. The method according to claim 1 wherein the source of sulfate ions and potassium chloride comprises a brine comprising potassium chloride.

9. The method according to claim 8 wherein the brine comprising potassium chloride is a potash tailings brine.

10. The method according to claim 1 wherein the sulfate ion source comprises up to 20% w/w $MgSO_4$.

11. The method according to claim 1 wherein the calcium sulfate is gypsum or a hemihydrate of calcium sulfate.

12. The method according to claim 11 wherein the gypsum is ground to less than 10 MESH in US Standard.

13. The method according to claim 11 wherein the gypsum is mixed with $H_2SO_4$ prior to reacting to form the syngenite cake.

14. The method according to claim 1 wherein the temperature of step (c) is 55-65° C.

15. The method according to claim 1 wherein the period of time in step (c) is about 2 hours.

16. The method according to claim 1 wherein the ammonium bicarbonate is present in step (c) at a concentration stoichiometrically required to decompose 75-100% of the syngenite cake.

17. The method according to claim 1 wherein the amount of ammonium bicarbonate in step (e) is in excess at a concentration stoichiometrically required to decompose 2-4 times more syngenite than the syngenite in the syngenite-$CaCO_3$ cake.

18. The method according to claim 1 wherein the temperature of step (e) is 40-60° C.

19. The method according to claim 1 wherein prior to step (f), the solution from step (c) is heated to a temperature above 90° C. to decompose the ammonium bicarbonate into ammonia and $CO_2$ gases for recycle.

20. The method according to claim 1 wherein following step (f), the solution is rapidly cooled to below 60° C. to precipitate potassium sulfate as $5K_2SO_4:(NH_4)_2SO_4$ double salt.

21. The method according to claim 1 wherein the reacted brine of step (e) is used as the reaction brine of step (c).

22. The method according to claim 1 wherein steps (c) and (e) are carried out in different reaction vessels.

23. The method according to claim 1 wherein the $CaCO_3$ cake has a L* Brightness of 98-99 and a purity of at least 95%.

* * * * *